March 29, 1966   B. LUSTMAN ETAL   3,243,350
CLAD ALLOY FUEL ELEMENTS
Filed Jan. 13, 1956
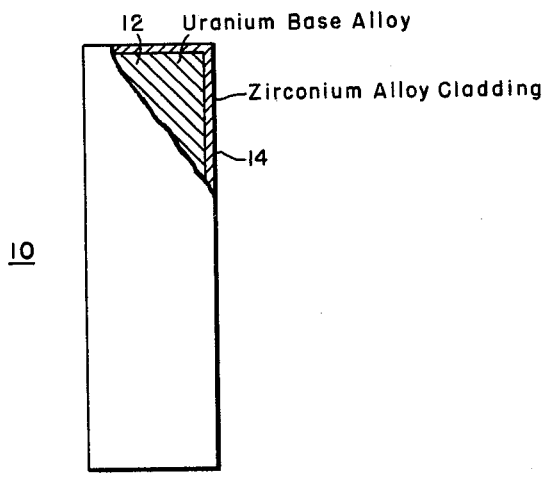
WITNESSES
Edwin E. Bassler
Leon M. Garman
INVENTORS
Robert K. McGeary &
Benjamin Lustman
BY
Frederick Shoop
ATTORNEY United States Patent Office 3,243,350
Patented Mar. 29, 1966

3,243,350
CLAD ALLOY FUEL ELEMENTS
Benjamin Lustman and Robert K. McGeary, Pittsburgh, Pa., assignors, by mesne assignments, to the United States of America as represented by the United States Atomic Energy Commission
Filed Jan. 13, 1956, Ser. No. 558,863
3 Claims. (Cl. 176—70)

The invention described herein was made in the course of, or under, a contract with the United States Atomic Energy Commission.

This invention relates to uranium base alloy members clad with certain zirconium alloys, such members being particularly suitable for use as fuel elements in nuclear reactors.

Certain nuclear reactors employ water as a moderating medium. Uranium fuel elements disposed in contact with the water, which will be at a high temperature, will corrode rapidly. Uranium metal has a short life when in contact with hot water or steam at temperatures of the order of 650° F. While certain alloys of uranium have a much superior corrosion resistance as compared to uranium metal alone when in contact with such hot water, their useful life is only moderate. In either case there is a considerable risk that the fuel elements will disintegrate unexpectedly at some premature time or will corrode so badly that the reactor and its operation will be harmfully affected.

It has been proposed heretofore to place uranium fuel elements within protective containers of aluminum, stainless steel, zirconium, and the like. Such protective cladding of the uranium fuel elements has not been perfect and completely reliable by reason of the possible presence of leaks, fissures or microscopic cracks therein which will admit high temperature water to the uranium fuel elements. The corrosion of the uranium will be rapid and may cause swelling of the clad elements and thereby result in a failure or other unsatisfactory reactor operation. In some instances, the clad elements have actually ruptured and introduced large amounts of radioactive components into the water or steam with highly undesirable results. In many cases the clad fuel elements have survived only about an hour in 650° F. water after the water penetrated through a crack or fissure in the cladding.

It is desirable to have available as a fuel element for a nuclear reactor a clad member which, even though it is not completely impervious or perfect, will greatly reduce the rate of corrosion of the uranium or uranium alloy so that there is a reasonable certainty that the fuel elements will have a certain minimum life of the order of 125 days in water at 650° F. even if the uranium alloy is exposed to water through the cladding from the beginning of life. Cladding applied to uranium fuel elements heretofore has not been sufficiently reliable or effective to assure in all cases such life for the fuel elements.

It will be understood further that the protective cladding must not exceed a certain proportion of the size or volume of the uranium fuel element proper otherwise the reactor properties are rendered greatly inferior. Consequently, there are limitations as to the amount or thickness of cladding that may be applied reasonably to a fuel element.

The object of the present invention is to provide a member suitable for use as a fuel element in a nuclear reactor comprising certain uranium alloy cores protected with a relatively thin cladding of a selected zirconium alloy.

A further object of the invention is to provide a fuel element comprising a core composed of a gamma phase uranium alloy and a thin cladding layer of a specific zirconium alloy.

Other objects of the invention will in part be obvious and will in part appear hereinafter. For a better understanding of the nature and objects of the invention, reference should be had to the following detailed description and drawing, in which the single figure is a view in elevation partly in section of a member produced in accordance with the invention.

We have discovered that certain uranium base alloys when clad with a relatively thin layer of a zirconium base alloy comprising from 0.1% to 2.5% by weight of tin and from 0.1% to 2% by weight of at least one element of the group consisting of iron, nickel, and chromium, and the balance being zirconium, have unusual corrosion resistance in hot water even though the cladding coating may not be perfect. There is a completely unexpected resistance to corrosion by water even though the zirconium alloy cladding contains openings which permit the hot water to contact the uranium alloy core.

We have discovered that uranium and uranium base alloys fail when in contact with hot water, or steam, by the formation of compounds with hydrogen and subsequent compounds formed by reaction with oxygen. In tests conducted by us, we have deliberately drilled small diameter holes in a number of places through the zirconium alloy cladding so that hot water would come in contact with the uranium alloy core and have found that the uranium alloy under these conditions does not corrode in the same way as the unclad alloy. In fact, the clad member may survive twenty to thirty times as long as it would with no cladding.

When the zirconium alloy cladding is completely impervious to the water, the life of the clad uranium alloy member is controlled solely by the failure of the zirconium alloy itself. A reasonable thickness of the zirconium alloy has a life, when in contact with hot water at 650° F., fully sufficient for all reasonable reactor purposes because the alloy has a low corrosion rate.

In preparing the clad members of the present invention, we have found it desirable to prepare the core of the members from uranium base alloys comprising elements in solid solution with the uranium under conditions of use. Alloys of uranium in which uranium comprises over 50% by weight, the balance being one or more of the other elements, may be employed in practicing the invention. Particularly suitable alloying elements are niobium and molybdenum. These two elements may be present individually or in combination, in amounts of from 1% to 25% and even more, the balance being uranium, either natural or enriched with uranium 235.

For best results, we prefer to employ the uranium alloys having a body centered cubic crystalline structure which is designated as the gamma phase. The gamma phase not only has improved corrosion resistance as compared to the alpha phase, but also its expansion due to to heat, radiation and other physical effects is substantially isotropic in the gamma phase whereas highly directional irregular changes occur in the alpha phase uranium alloys. Niobium and molybdenum, when present in substantial amounts, enable members of the uranium alloy, when cooled from the gamma field of the phase diagram, about 900° C. and higher, to retain the gamma phase at room temperature. In particular, 9% and higher of molybdenum and 7% and higher of niobium not only enables the gamma phase to be retained at room temperature, but also greatly prolongs the time before transformation of the gamma to the alpha, even at temperatures of up to 400° C. The preparation of some of these base alloys is set forth in copending applications assigned to the assignee of the present invention which have become U.S. Patents 2,888,343; 2,914,433, and 2,926,113, in which one of the present inventors is a co-inventor with others. All of the alloys of these three patents are suitable for use in practicing the present invention.

More particularly, an ingot of the desired uranium base alloy or a first extruded bar of the alloy is homogenized at 900° C. for several hours in order to reduce microsegregation, and then is placed within a closely fitting cylinder or receptacle of the zirconium alloy and the assembly is then hot extruded at a temperature of about 1700° F. into a rod or bar of desired dimensions. In some cases, the co-extruded member may be cold rolled or drawn to the final required precise size. After the extruded bar has been cut to desired length of member, the ends are sealed by welding a closure of the zirconium alloy to the exterior jacket or cladding.

Referring to the figure of the drawing, there is illustrated a clad member 10 comprising a core 12 composed of the uranium base alloy, preferably gamma phase, and a relatively thin cladding 14 comprising the specific zirconium alloy. While the cladding should be as impervious and perfect as possible, it has been found that imperfections which may permit hot water to reach the core 12 are not as disastrous as they would be with other cladding materials. The cladding may have a thickness of the order of 10% of the thickness or diameter of the core 12. It will be appreciated that the thickness of the cladding may be somewhat greater or even considerably less, for example, of a thickness as little as 3% to 5% of the diameter or thickness of the core 12.

The uranium employed in producing the alloy may have impurities totaling 500 parts per million. The uranium may be enriched with, for example, 10% of uranium 235, the balance being uranium 238. The degree of enrichment may vary as desired. We may employ cores comprising uranium 235 entirely. The uranium and the alloying components may be melted in a vacuum induction furnace comprising a graphite crucible coated with a wash of zirconium oxide. The molten alloy is poured into a zirconia washed graphite mold and solidified into an ingot which may be hot worked to size and shape. Alternatively, this ingot may be employed as the consumable electrode in an arc melting furnace and employed to produce a larger and more homogeneous ingot, if desired. Such electric arc remelting is set forth in Gordon et al. application, Serial No. 367,524, filed July 13, 1953, and now Patent No. 3,072,982, issued June 15, 1963.

The zirconium alloy employed for the cladding will consist essentially of from 0.1% to 2.5% by weight of tin, a total of from 0.1% to 2% by weight of at least one metal selected from the group consisting of iron, nickel, and chromium, less than 0.5% by weight of incidental impurities, and the balance being zirconium. It is desirable that these zirconium alloys contain less than 0.05% by weight of carbon. The zirconium may be pure zirconium or for certain purposes, it may be the natural metal which may contain up to 3% by weight of hafnium. For reactors, essentially pure zirconium will be used that contains not exceeding 0.05% by weight of hafnium.

Particularly good results have been secured from the zirconium alloy in which iron, nickel and chromium are all present in total amount not exceeding 2%. We have obtained excellent clad members by extruding alloys consisting of from 1.3% to 1.6% by weight of tin, from 0.05% to 0.16% by weight of chromium, 0.04% to 0.08% by weight of nickel, from 0.07% to 0.20% by weight of iron, less than 0.3% by weight of incidental impurities being present, and the balance being zirconium. The specific last-mentioned alloys were readily fabricated by both hot and cold forming operations into numerous types of members. In water or steam at temperatures of up to and including 750° F., the corrosion resistance was outstanding. A sample of annealed hot rolled strip within this last range of proportions has a 0.2% yield strength of 22,700 pounds per square inch in a tensile test conducted at 500° F., and a Rockwell B hardness of 91.

The following examples illustrate zirconium alloys in accordance with the invention:

TABLE I
*Typical alloy analyses*

| Alloy | Sn | Cr | Ni | Fe | $N_2$ |
|---|---|---|---|---|---|
| A | 0.7 | 0.4 | 0.4 | 0.2 | 0.004 |
| B | 1.0 | 0.5 | 0.25 | 0.15 | 0.004 |
| C | 1.2 | 0.3 | 0.2 | 0.15 | 0.005 |
| D | 1.5 | 0.1 | 0.05 | 0.12 | 0.006 |
| E | 1.8 | 0.05 | 0.05 | 9.10 | 0.008 |
| F | 2.0 | 0.05 | 0.05 | 0.06 | 0.010 |

The balance of each alloy was zirconium, and traces of incidental impurities. The carbon content of all of the above alloys was less than 0.05%.

It will be appreciated that various methods of producing the alloy may be employed. In one instance, for example, the alloy was prepared by initially melting zirconium in an arc melting furnace and then adding pellets prepared beforehand by alloying tin, iron, nickel and chromium in the desired proportions.

A series of alloys was prepared in which tin was maintained at 1.5%, the total of nickel, iron and chromium in nearly equal proportions being varied from 0.1% to 0.5%, the balance being zirconium and less than 0.2% of incidental impurities, and wrought strips of each of these alloys were tested in water at 680° F. for 98 days. The average corrosion in milligrams of absorbed oxygen per square decimeter of surface is about 160 when only traces of iron, nickel and chromium are present in the 1.5 tin-zirconium alloy. The corrosion rate in this test dropped from 48 at 0.5% total iron-nickel and chromium to 32 at 0.3% and then increased slowly to 38 at 0.5%. These data indicates a minimum rate of corrosion occurs in the zirconium-tin alloys having approximately 0.3% by weight of combined iron, nickel and chromium.

The following examples are illustrative of the invention.

EXAMPLE I

An ingot comprising 9% by weight of molybdenum and 91% by weight of natural uranium was disposed within a tube of a zirconium base allay composed of 1.5% tin, 0.10% chromium, 0.12% iron and 0.06% nickel. The assembly was heated to 1700° F. and extruded to a round bar of a diameter of 0.30 inch. The zirconium alloy cladding had a wall thickness of 0.03 inch. The extruded bar was cut into lengths and discs of the zirconium alloy were welded to the cladding at each end to provide completely sealed clad members.

The clad members were then placed within an autoclave containing water at 650° F. in order to determine the protective properties of the cladding. All of the alloy elements were drilled to produce holes of a diameter of 0.04 inch completely through the cladding. Other samples of the extruded members were stripped of the zirconium alloy cladding so that the uranium alloy surface was completely exposed. The uranium alloy in each case was in the gamma phase. When tested in the hot water the unclad uranium alloy specimens had completely corroded away in a period fo 14 to 28 days while the zirconium alloy clad members had a life of 115 to 189 days before failing due to corrosion.

Other members of uranium base alloys containing 10.5%, 12% and 13.5% of molybdenum were prepared as in Examples I and subjected to tests in water at 650° F. to determine their effective life before failing from corrosion. The following results were obtained for the members clad with the zirconium base alloy and other members which were not provided with any cladding:

| Alloy | Life in Days Clad Members | Life in Days Unclad Alloy |
|---|---|---|
| 10.5 Mo | 105 to 183 | 14 to 28 |
| 12 Mo | 245 to 273 | 28 to 42 |
| 13.5 Mo | [1] 287 | 14 to 28 |

[1] Test still in progress—members had not failed.

EXAMPLE II

An ingot of 2.4 inches diameter was prepared from 90 parts of natural uranium and 10 parts of niobium following the procedure of Example I. The ingot was placed within a closely fitting sheath of the zirconium alloy of Example I. The composite unit was heated to 1700° F. and extruded to produce clad rods of a diameter of 0.30 inch, the zirconium alloy cladding being of a thickness of 0.03 inch. A number of specimens were cut from the clad extruded rod. Several of the specimens were provided with welded end caps of the zirconium alloy while in other specimens the zirconium alloy cladding was completely removed. All of the specimens were then placed in a furnace and heated to 900° C. for 24 hours in order to homogenize the uranium alloy. The members were quenched and the uranium alloy was entirely in the gamma phase. The clad specimens were drilled to provide a hole of a diameter of 0.04 inch penetrating through the zirconium alloy cladding and exposing the uranium alloy.

The specimens were placed in an autoclave where they were in contact with water at a temperature of 650° F. The unclad uranium-niobium alloy specimens had completely corroded in a period from 49 to 63 days. The clad specimens had all withstood 273 days in the autoclave without failure.

Several of the clad and unclad specimens from the original extruded bar were heated in a furnace for a period of time of 42 days at 400° C. and then subjected to testing in 650° F. water in the autoclave. The clad specimens had not failed at the end of 112 days of testing. By comparison, unclad specimens of the niobium-uranium alloy after a preliminary heating for 35 days at 400° C. failed in from less than 1 day to 7 days in the 650° F. water. The heat treatment at 400° C. for 35 to 42 days had initiated the transformation of the gamma phase to the alpha phase which is much more sensitive to corrosion when in contact with hot water and steam. This last test, therefore, illustrates the unusual protective characteristics of the zirconium alloy cladding when associated with the uranium base alloy even in the alpha phase.

In our clad members, the zirconium alloy cladding seems to dissolve any hydrogen preferentially so that the uranium alloy cannot react with the hydrogen. It appears, therefore, that the uranium alloy cladding should be firmly bonded or welded to uranium in order to provide the maximum protection.

It will be understood that properly clad members may be prepared by rolling or forging procedures which may be applied to ingots, slabs, bars, and the like of the uranium alloy, for example, by welding the zirconium alloy sheets of preformed members completely about the uranium alloy shape. The hot working of the clad structure will cause metallurgical bonding between the cladding and the uranium base alloy.

It will be appreciated that when the zirconium alloy cladding is completely impervious that the life of the members unexposed to hot water and steam will be substantially greater than evidenced by the above tests wherein holes were deliberately drilled through the cladding. In the case of imperforate cladding, the life of the member will be dependent primarily on the life of the zirconium alloy cladding.

It will be understood that the above description and drawing are only illustrative of the invention.

We claim as our invention:

1. A member suitable for use as a fuel element in a nuclear reactor and having a minimum life of about 125 days even when its cladding contains a hole having a diameter of 0.04 inch comprising a core comprising an alloy composed of from 75% to 99% by weight of uranium and the balance being at least one element selected from the group consisting of niobium and molybdenum, and a cladding layer covering the core comprising an alloy consisting essentially of from 0.1% to 2.5% by weight of tin, from 0.1% to 2% by weight of at least one element selected from the group consisting of iron, nickel and chromium and the balance being zirconium, with less than 0.5% of incidental impurities, the thickness of the cladding layer being 0.03 inch.

2. A member suitable for use as a fuel element in a nuclear reactor and having a minimum life of about 125 days even when its cladding contains a hole having a diameter of 0.04 inch comprising a core comprising an alloy composed of from 75% and 99% by weight of uranium and the balance being at least one element selected from the group consisting of niobium and molybdenum, and a cladding layer covering substantially all of the core comprising an alloy consisting essentially of from 0.5% to 2.5% by weight of tin, from 0.05% to 1% by weight of chromium, from 0.05% to 0.5% by weight of nickel, from 0.05% to 0.5% by weight of iron, carbon not exceeding 0.05%, less than 0.5% by weight of incidental impurities, and the balance being zirconium.

3. A member suitable for use as a fuel element in a nuclear reactor and having a minimum life of about 125 days even when its cladding contains a hole having a diameter of 0.04 inch comprising a core comprising an alloy composed of from 75% and 99% by weight of uranium and the balance being at least one element selected from the group consisting of niobium and molybdenum, and a cladding layer covering substantially all of the core comprising an alloy consisting of from 1.3% to 1.6% by weight of tin, from 0.05% to 0.16% by weight of chromium, from 0.07% to 0.20% by weight of iron, from 0.04% to 0.08% by weight of nickel, not over 0.3% by weight of incidental impurities, and the balance being zirconium, the thickness of the cladding layer being 0.03 inch.

References Cited by the Examiner

UNITED STATES PATENTS

| 1,948,242 | 2/1934 | Schubarth | 207—10 |
| 2,358,892 | 9/1944 | Upton | 207—10 |
| 2,746,134 | 5/1956 | Drummond | 29—191.2 |
| 2,756,489 | 7/1956 | Morris | 29—194 |
| 2,772,964 | 12/1956 | Thomas. | |
| 2,813,073 | 11/1957 | Saller et al. | |
| 2,820,751 | 1/1958 | Saller. | |
| 2,830,896 | 4/1958 | Seybolt. | |
| 2,863,816 | 12/1958 | Stacy. | |

OTHER REFERENCES

AECD–3788, Nov. 18, 1953, pp. 23–25 and 30–32.
ANL–5030, Apr. 14, 1953, pp. 5 and 6.
BMI–957, Oct. 21, 1954, p. 10.
Evans: "Iron Age," March 13, 1952, pp. 93–97.
Thomas: "Proceedings of the International Conference on the Peaceful Uses of Atomic Energy," vol. 9, pp. 407–413, August 1955, United Nations Publication, N.Y.

LEON D. ROSDOL, *Primary Examiner.*

WILLIAM G. WILES, ROGER L. CAMPBELL,
*Examiners.*

R. EPSTEIN, H. H. BRADLEY, V. G. GIOIA, M. J. SCOLNICK, *Assistant Examiners.*